United States Patent Office 3,483,128
Patented Dec. 9, 1969

3,483,128
PROCESS FOR THE INCINERATION OF FLUORINE CONTAINING ORGANIC LIQUID
Lucienne Rodi and Guy Lefillatre, Bagnols sur Ceze, France, assignors to Commissariat a l'Energie Atomique, Paris, France
No Drawing. Filed July 31, 1967, Ser. No. 657,029
Claims priority, application France, Aug. 12, 1966, 73,048
Int. Cl. C09k 3/00; C01f 11/22
U.S. Cl. 252—301.1                7 Claims

ABSTRACT OF THE DISCLOSURE

A process for the incineration of fluorine-containing organic liquids, comprising the combustion of the liquid and the neutralisation of the hydrofluoric acid liberated. This process also includes the addition to the liquid to be treated of a metallic soap comprising a fatty-acid calcium salt that is soluble in the above-mentioned liquid in a proportion at least equal to the stoichiometric proportion, the combustion of the resulting mixture, and the filtration of the combustion gases to retain any calcium fluoride that may have been entrained.

---

This invention relates to a process for the incineration of fluorine-containing organic liquids, comprising the combustion of the liquid and the neutralisation of the hydrofluoric acid liberated during the combustion.

In industrial atomic centres, incineration solves the problem of the destruction of contaminated organic liquids, generally consisting of heavy organic solvents and oils, resulting in a very high volume-reduction factor. To ensure absolute safety, while avoiding any dispersion of the radioactive elements that might be entrained in the combustion gases, incineration is completed by purification of the combustion gases by filtration.

This conventional method, however, is insufficient when the organic liquids treated contain fluorine ions. The latter may generally be in three forms in the liquids treated viz:

In the state of a metallic fluoride,
In the free state of fluorine, hydrofluoric acid or chlorine fluoride, and
In the state of fluorine-containing organic derivatives.

On the incineration of these fluorine-containing organic liquids, fluorine (with the exception of the fluorine derived from metallic fluorides that are stable at 1000° C.) passes into the combustion gases in the form of hydrofluoric acid. The latter must be retained in the purification system downstream of the incineration plant before the discharge of the gases into the atmosphere.

But there is then a problem due to the corrosive power of hydrofluoric acid. The filters that are used in conventional processes which must be non-inflammable, generally have silicon as a component element, for example in fabrics of glass or asbestos, or in ceramics, and they are therefore attacked by gases containing hydrofluoric acid. The acid gases must therefore be neutralised before their passage to the filtration elements.

This requirement makes it necessary to install a complex neutralisation system. Neutralisation is generally effected by the moist method in trickling towers or in alkaline-washing cyclones, for example, and it must be followed by separation of the moist particles and heating of the gases above their dew points, to prevent any condensation in the filtering elements.

The addition of plant that is made necessary involves appreciable investment and running costs, especially as the material used is subjected to serious risks of corrosion. It also has the disadvantage of producing an additional volume of contaminated liquid effluents.

This invention has for its object to enable fluorine-containing organic liquids to be incinerated without any risk of deteriorating the filtering elements interposed on the path of the combustion gasses, and avoiding the discharge of hydrofluoric acid.

The invention also sets out to eliminate the disadvantages of known processes as mentioned above, and in particular to provide for the efficient and complete purification of the fluorine by a process that is simple and cheap to operate.

According to the invention there is provided a process for the incineration of fluorine-containing organic liquids comprising the combustion of the liquid and the neutralisation of the hydrofluoric acid liberated, said process comprising the addition to the liquid to be treated of a salt, soluble in that liquid, of an alkaline-earth metal or magnesium, in a proportion at least equal to the stoichiometric proportion necessary for the neutralisation of the hydrofluoric acid, the combustion of the resulting mixture, and the filtration of the combustion gases in order to retain any metallic fluoride that may have been entrained.

The salt used is advantageously either a metallic soap comprising a fatty-acid alkaline-earth metal or magnesium salt, or an organo-metallic compound comprising phenolic derivatives neutralised by alkaline-earth metals or magnesium, soluble in above-mentioned liquid.

These salts are preferably used in the form of a solution in an organic solvent such as white spirit, fuels, various solvents derived from petroleum or aromatic solvents.

A specific embodiment of the process according to the invention will now be described by way of example. This description does not limit the invention in any way.

According to the invention, a calcium salt of a fatty acid, a calcium phenolate or a mixture of a calcium phenolate and calcium sulphonate, soluble without difficulty in the liquid treated, is used to neutralise the hydrofluoric acid when it is formed on the combustion of these liquids. Thus, it is advantageous to use either an additive having a high content of calcium phenolate containing 9.25% of calcium or a formulation on a basis of calcium octoate previously dissolved in white spirit and containing between 4% and 7% of calicum, which are mixed without difficulty with fluorinated oils by simply stirring in any container.

The oil treated in this way is injected, for example, into a burner in the combustion chamber of an incineator. The temperature of an oil-burner flame is generally between about 700° C. and 800° C. The gases can subsequently be heated to 1000° C. in a post-combustion chamber.

The hydrofluoric acid produced by the incineration of the fluorinated liquid organic products is totally neutralised on combustion by the calcium of the soap dissolved in the liquid. The octanoic or phenolic radicals are completely destroyed, their combustion producing carbon dioxide gas and water. On the other hand, the calcium fluoride formed by the neutralisation of the hydrofluoric acid remains stable at 1000° C. The reaction is total and instantaneous.

Part of the inert calcium fluoride obtained is deposited with the residual ashes of the combustion. The other part is entrained in the combustion gases, but it is stopped without difficulty in filtering elements of known type disposed downstream of the combustion chamber. The calcium fluoride being inert, its presence in the combustion gases is not liable to corrode the filtering elements.

Instead of being injected into oil burners, the fluorine-containing organic liquids to be treated may also be introduced onto a bed in the combustion chamber of an incinerator or into a calcination crucible. In any case, the process for the neutralisation of the hydrofluoric acid is effected in a similar manner at the time of combustion.

The process according to the invention makes it possible to incinerate and neutralise free fluorine radicals, for example hydrofluoric acid or chlorine trifluoride, and also organic fluorine-containing radicals that decompose at high temperatures with the liberation of hydrofluoric acid.

The fact that the hydrofluoric acid is neutralised by means of a liquid dissolved in the organic liquid to be treated appears to be particularly interesting. The contact of the liquid treated with the calcium soap is then excellent while, for example, the contact of oils with solid lime could not be thorough enough to ensure efficient neutralisation.

The process recommended is particularly simple. It avoids the use of the large number of successive stages that are necessary in methods proposed previously. The plant used for its implementation is not complicated, while, for example, the saponification of fluorine-containing organic liquids before their combustion would require, for instance, the addition of a heating system, and, where appropriate, a system for the separation of the water and the organic liquid.

To give an example, the process described above has been applied to the treatment of an organic derivative that is very rich in fluorine, i.e. thenoyl-2-trifluoroacetone, which contains 25.69% of fluorine and has the following structural formula:

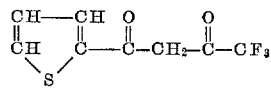

The calcium soap chosen was a commercial calcium octoate in liquid form. Solid calcium octoate had been dissolved in white spirit. Its calcium content had been stopped at 4% with a view to the acceptable viscosity of the solution obtained. The liquid reagent containing 33% by weight of calcium octoate is perfectly pumpable and mixes very with any aromatic and aliphatic solvents, with any polar solvents and any oils.

Calcination tests have shown that the optimum dose of calcium to be used in the form of calcium octoate is 200% of the theoretical, or in the present case 45 g. of Ca, i.e. 1125 g. of 4% calcium octoate solution to 100 g. of thenoyltrifluoroacetone.

The thenoyltrifluoroacetone was dissolved in a weight of white spirit representing ⅔ of the commercial calcium octoate solution.

The resulting fluorine-containing organic solution was burned in a furnace in an oxidising medium. Tests carried out at different temperatures (600°, 700°, 800°, 900° and 1000°) gave the same results.

The whole of the fluorine was present in the calcination crucible in the form of $F_2Ca$.

In this example, large quantities of reagent were used because of the very high fluorine content (25%) in the product to be destroyed. In practice, fluorine-containing organic liquids have distinctly lower fluorine contents (0.5% to 1%), and this avoids the use of a large amount of calcium octoate or calcium phenolate and limits the cost of neutralisation.

We claim:

1. A process for the incineration of radioactive fluorine containing organic liquids comprising the steps of adding to the liquid to be treated a salt soluble in the liquid selected from the group consisting of an alkaline earth metal and magnesium in an amount sufficient for the neutralization of the hydrofluoric acid generated during incineration, then incinerating the resulting mixture in a combustion chamber at about 700–1000° C. and then filtering the combustion gases from the chamber to remove any metallic fluoride.

2. A process as described in claim 1, the salt being a metallic soap.

3. A process as described in claim 1, the salt being an organo-metallic compound of phenol derivatives.

4. A process as described in claim 2, the metallic soap being calcium octoate.

5. A process as described in claim 3, the organo-metallic compound being calcium phenolate.

6. A process as described in claim 1, the salt being in solution in an organic solvent.

7. A process as described in claim 1, the proportion of the salt in the liquid to be treated being substantially equal to twice the quantity necessary for the complete neutralization of the hydrofluoric acid liberated on incineration of the fluorene containing liquid.

References Cited

UNITED STATES PATENTS

| | | | |
|---|---|---|---|
| 3,120,493 | 2/1964 | Clark et al. | 252—301.1 |
| 3,196,619 | 7/1965 | Shock | 252—301.1 |
| 3,265,627 | 8/1966 | Clark et al. | 252—301.1 |
| 3,330,088 | 7/1967 | Dunlea | 252—301.1 X |

BENJAMIN R. PADGETT, Primary Examiner

M. J. SCOLNICK, Assistant Examiner

U.S. Cl. X.R.

23—90